United States Patent

Kostanian

[11] Patent Number: 6,129,842
[45] Date of Patent: Oct. 10, 2000

[54] MULTIPHASE EXTRACTOR

[75] Inventor: Artak Eranosovich Kostanian, Leverkusen, Germany

[73] Assignee: Bayer Aktiengesellschaft, Leverkusen, Germany

[21] Appl. No.: 09/077,739

[22] PCT Filed: Dec. 12, 1996

[86] PCT No.: PCT/EP96/05551

§ 371 Date: Jun. 10, 1998

§ 102(e) Date: Jun. 10, 1998

[87] PCT Pub. No.: WO97/22393

PCT Pub. Date: Jun. 26, 1997

[30] Foreign Application Priority Data

Dec. 15, 1995 [RU] Russian Federation .............. 95121245

[51] Int. Cl.[7] .................................................. B01D 24/00
[52] U.S. Cl. ................................... 210/284; 210/DIG. 5; 422/257
[58] Field of Search .................................. 210/634, 251, 210/DIG. 5, 283, 284; 422/256, 257

[56] References Cited

U.S. PATENT DOCUMENTS

| | | | |
|---|---|---|---|
| 2,088,497 | 7/1937 | Tijmstra | 422/256 |
| 2,176,806 | 10/1939 | Schuessler et al. | 422/256 |
| 2,721,790 | 10/1955 | Olney | 422/258 |
| 3,666,405 | 5/1972 | Winsel | 422/256 |
| 5,041,227 | 8/1991 | Eikeren et al. | 210/640 |
| 5,219,533 | 6/1993 | Larson | 422/257 |

FOREIGN PATENT DOCUMENTS

| | | |
|---|---|---|
| 0 514 201 A1 | 5/1992 | European Pat. Off. . |
| 0 514 201 | 11/1992 | European Pat. Off. . |
| 2 190 012 | 11/1987 | United Kingdom . |
| 2190012 | 11/1987 | United Kingdom . |

OTHER PUBLICATIONS

XP002029205, Soviet Inventions Illustrated, dated 4–19–80.

*Primary Examiner*—Ivars Cintins
*Attorney, Agent, or Firm*—Norris, McLaughlin & Marcus, P.A.

[57] ABSTRACT

This multi-phase extraction apparatus has at least two chambers 1, 2, which are connected at their upper and lower parts by connection channels 4, which are equipped with dispersing devices 3, and which have nozzles 12, 13, 15, 16 for the feeding and discharge of a first and a second disperse phase. Separation zones 7, which are equipped with coalescence-promoting packings 8, are situated in the region of the mouths of the connection channels 4 leading into the chambers 1, 2. In addition, the connection channels 4 can also be equipped with coalescence-promoting packings 9.

5 Claims, 1 Drawing Sheet

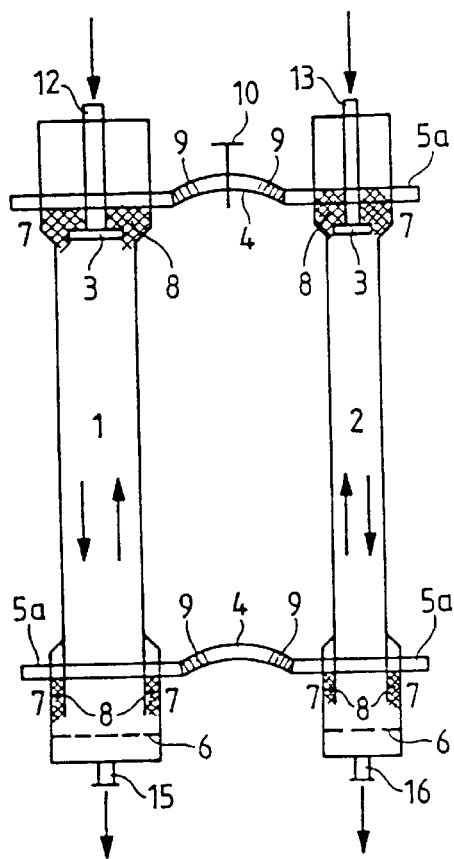
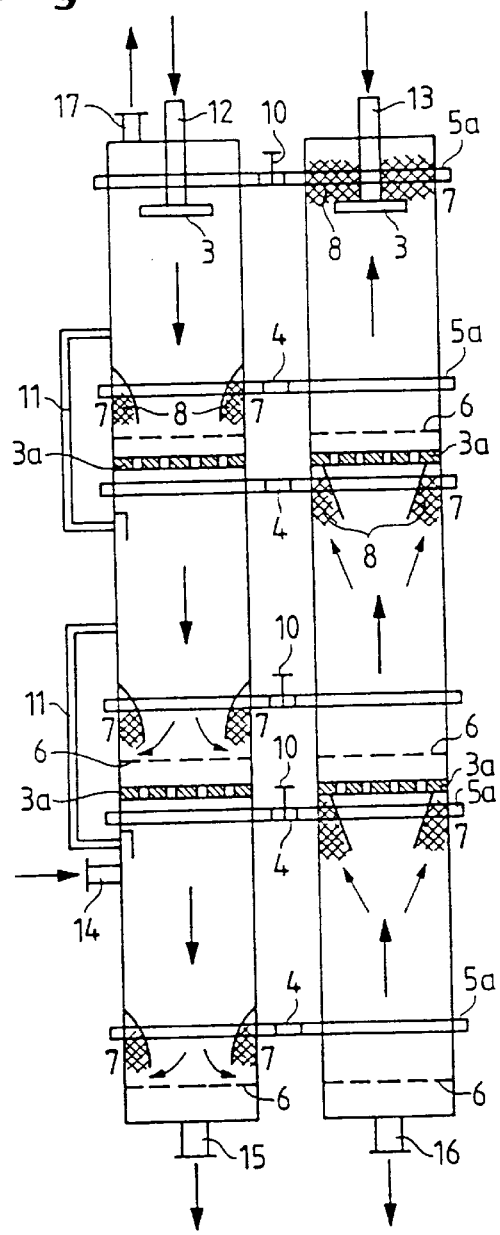
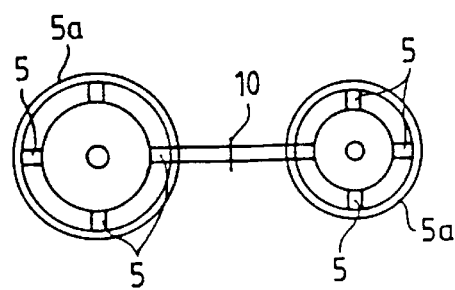

MULTIPHASE EXTRACTOR

This application is a 371 of PCT/EP96/05551, filed Dec. 12, 1996.

This invention stems from a multi-phase extraction apparatus having at least two chambers, which are connected at their upper and lower parts by connection channels, which are equipped with dispersing devices, and which have nozzles for the feeding and discharge of a first and a second disperse phase.

A multi-phase extractor such as this can be used in the chemical, hydrometallurgical and microbiological industries, and in other branches of industry, for the separation, extraction, concentration and purification of substances.

Apparatuses for carrying out three-phase liquid extraction processes are known in the form of a two-chamber system, wherein the two chambers are connected to each other at their upper parts or comprise a porous partition wall. The chambers are filled with a continuous phase through which two dispersed phases, which are insoluble in the continuous phase, are passed in the form of droplets. Mass transfer is thereby effected from one dispersed phase (the raffinate phase), through the continuous phase (which is also termed the liquid membrane phase), into the other dispersed phase (the extract phase) (for example, see the journal "Theoretische Grundlagen der chemischen Technologie" 1984, Part 18, No. 6, pages 736–738).

These apparatuses are in need of improvement as regards their efficiency and their extension to multi-stage processes.

From a technical point of view and from the point of view of the effect which can be achieved, the three-phase extractor which consists of a first and a second chamber filled with the continuous phase (liquid membrane) comes closest to these known apparatuses. The chambers have devices for the dispersion of the respective phase, and are connected to each other by overflows for the circulation of the continuous phase. The overflows are constructed in the form of pipes which connect the upper and lower parts of each chamber to each other. The extractor is provided with nozzles for the feeding and discharge of the first and second dispersed phases (Russian Patent Application No. 94-015776/26 (015406) of Apr. 27, 1994).

The phase which is to be dispersed, which is the starting solution (raffinate), and the solvent (extract phase) are each broken down into droplets in the corresponding chamber, by means of a dispersing device. These droplets move through the continuous phase as a swarm of droplets. Due to the density differences between the emulsions in the first and second chambers, circulation of the continuous phase occurs through the top and bottom overflows, so that a transfer occurs of the substance to be extracted from one chamber into the other, and from the first phase to be dispersed into the second phase to be dispersed.

One disadvantage of this known three-phase extractor is that droplets of the dispersed phase are entrained from one chamber into the other by the continuously circulating continuous phase. This phenomenon, which results in a decrease in the efficacy of the apparatus and in contamination of the extract phase, is intensified in particular when there is an increase in the ratio of the mass flows of the raffinate phase and the extract phase, due to an increase in the driving force for circulation (difference between the densities of the emulsions in the first and second chambers).

When extraction is carried out for the concentration of substances from dilute solutions, e.g. for the concentration of metals from waste water, the ratio of the flows of the raffinate and extract may be greater than 50. The construction of said extractor is in need of improvement as regards processes of this type.

The object of the present invention consists of increasing the efficacy of this multi-phase extractor by reducing the entrainment effect.

This object is achieved according to the invention, starting from the apparatus described at the outset, by providing the chambers with separation zones which are equipped with coalescence-promoting packings and which are placed in the chambers in the region of the inlet openings of the connection channels.

The connection channels are preferably provided, at their mouths leading into the chambers, with annular distributors which are connected to the chambers via openings and which are additionally equipped with a coalescence-promoting packing.

Coalescence-promoting packings are also advantageously disposed in the connection channels.

According to a further embodiment of the invention, the connection channels for conveying the phases are of curved construction and are provided with a device for adjusting the velocity of circulation of the continuous phase.

By filling the separation zones with packing bodies in the inlet openings of the overflows, the entrainment of droplets from one chamber into the other by the circulating flow of the continuous phase is prevented due to the coalescence of the small droplets within the packing bodies, and the carry-over of larger droplets into the working zone of the chambers is also prevented.

By connecting the overflows to the chambers by a series of openings which are situated at the shell periphery, a uniform velocity distribution of the continuous phase over the cross-section of the chambers is achieved in the separation zone; this reduces the probability of droplets being entrained. This effect is also favoured by the separating packing bodies of the overflows. Moreover, the efficacy of mass transfer of the extractor is increased due to a uniform velocity distribution of the continuous phase over the cross-section of the chambers.

The construction of the overflows in the form of curved pipes results in an additional separation of small droplets which "slip through" the separation zones of the chambers. The regulating valve on the overflows enables the velocities of circulation to be adjusted for any ratios of raffinate and extract phase. The optimum conditions of flow can thereby be set in order to prevent carry-over of droplets.

The additional arrangement of chambers of analogous construction under the first and second chambers enables multi-stage mass transfer processes to be carried out in the multi-phase extractor. The connection of the upper and lower chambers by overflows for the continuous phase enables separation processes to be effected in the form of liquid membranes and as multi-phase extraction processes also.

Two of the options for the construction of the proposed multi-phase extractor are illustrated in FIGS. 1 to 3.

FIG. 1 illustrates a single-stage extractor for carrying out processes for the separation of substances with a stationary continuous phase which serves as a liquid membrane.

FIG. 2 illustrates a multi-stage extractor which can be operated either as a liquid membrane extractor or as a multi-phase (3-phase) extractor.

FIG. 3 is a sectional illustration of a single-stage extractor.

The multi-phase extractor consists of a first 1 and a second 2 chamber, which are equipped with dispersing devices 3. Chambers 1 and 2 are connected at their upper and lower regions by overflows 4. The overflows are connected to chambers 1 and 2 by openings 5, which are disposed on an annular distributor pipe 5a mounted on the shell periphery of chambers 1/2. Depending on the densities of the phases which are brought into contact, the connecting openings 5 are disposed higher or lower than the phase boundary in chambers 1 and 2. The separation zones 7, which are disposed at the inlet openings 5 of overflows 4 (for the circulating continuous phase of the chambers), are situated in chambers 1 and 2.

The separation zones 7 are equipped with packing bodies 8. The overflows 4 are likewise provided with separating packing bodies 9, and have a valve 10 for regulating the velocity overflows 4 are constructed in the form of curved pipes. Instead of packing bodies 8, 9, dumped material, packing materials or knitted cloth materials can also be used for promoting coalescence.

The multi-stage extractor (FIG. 2) is provided with additional chambers 1 and 2 which are situated under the first 1 and second 2 chambers. The upper and lower chambers are connected to each other by overflows 4 for the continuous phase 2.

The extractors are equipped with nozzles 12, 13, 14 for the feeding of the phases and with nozzles 15, 16, 17 for the discharge of the phases.

The multi-stage extractor operates according to the following principle:

The 1st and 2nd chambers are filled with the continuous phase. The first and second phases to be dispersed are fed to chambers 1/2 via nozzles 12, 13 and via dispersing device 3. Depending on the density of the liquids which are brought into contact, the droplets of the dispersed phase move upwards or downwards in chambers 1 and 2 and coalesce at the phase boundary. In the multi-stage apparatus, this process of dispersion and coalescence is repeated in each stage. Dispersion of the phases which are to be dispersed is effected in the chambers of the second and subsequent stages (corresponding to the movement of the phase streams) by the perforated partition walls 3a. In this manner, said perforated partition walls 3a constitute the dispersing device for the chambers of the second and subsequent stages. The dispersed phases are discharged from the extractor by means of nozzles 15, 16.

During the movement of the swarms of droplets through chambers 1 and 2, dispersions of different densities are formed. This results in both an ascending and a descending movement of the continuous phase. Circulation between chambers 1 and 2 occurs through openings 5 which are situated on the shell periphery of distributor pipe 5a on overflow 4.

When flow occurs through the packing bodies 8 in separation zones 6 and 7 of chambers 1 and 2, the small droplets of the dispersed phase which are entrained by the continuous phase are separated therefrom. In this manner, a decrease in the efficacy of the separation process due to the mixing of the streams of the first and second disperse phases is prevented.

In some processes, the formation of dilute emulsions is possible. In this situation, small droplets in the separation zone 7 which have "slipped though" are separated within the separating packing bodies 9 which are situated in the curved overflows 4 (FIG. 1). To prevent the entrainment of these small droplets under the effect of considerable driving forces for circulation (when there are large differences between the densities of the dispersions in the first and second chambers), the velocity of circulation can be reduced if necessary by means of the valve 10.

For the effective separation of droplets, the packing bodies 8 and 9 are made of materials which are wetted by the dispersed phase. The packing bodies may be provided in the form of ordered or random packings.

The multi-phase extractor can be used as an apparatus for the separation of substances by means of liquid membranes, and can also be used as an apparatus for multi-phase extraction.

In the first case, the starting solution (raffinate phase) is introduced into one of chambers 1 or 2 as a phase which is to be dispersed. The substance to be extracted is extracted by the continuous phase with the formation of a complex or of another compound. The transfer reagent is then contained in the continuous phase. The substance which is extracted by the circulating continuous phase (which serves as a liquid membrane in this case) is transferred into the other chamber, where re-extraction by the 2nd dispersed phase (extract phase) occurs. The continuous phase may be stationary (FIG. 1) or flowing (FIG. 2) here. The phases to be dispersed can be fed in an alternating sequence (FIG. 1) in periodic (cyclic) operation.

In the second case, the starting solution, which contains a plurality of components, is fed to the extractor via nozzle 14 (FIG. 2), and the component to be extracted is extracted by the dispersed phases in chambers 1 and 2. In the multi-stage column apparatus (FIG. 2), countercurrent contacting takes place between the continuous and dispersed phases. The continuous phase flows from stage to stage through connecting lines 11, which connect the upper and lower chambers, and leaves the apparatus through nozzle 12.

Said multi-phase extractor makes it possible effectively to carry out separation processes at different ratios of raffinate and extract. Moreover, it is possible using this apparatus to carry out a cyclic mode of operation with successive contact between the disperse and continuous phases.

What is claimed is:

1. A multi-phase extraction apparatus having at least two chambers (1,2), each having an upper part and a lower part, and which are connected to each other at their upper and lower parts by connection channels (4), inlet nozzles (12,13, having dispersing devices (3) for the feeding of a first and a second disperse phase and outlet nozzles (15,16) for the discharge of said first and second disperse phases wherein said chambers comprise, adjacent said connection channels (4), separation zones (7) within which are disposed coalescence-promoting packings (8).

2. An apparatus according to claim 1, wherein said connection channels (4) are connected to said chambers through annular distributors (5a) which are open to the chambers (1,2) through openings (5).

3. An apparatus according to claim 1, characterised in that coalescence-promoting packings (9) are also disposed in the connection channels (4).

4. An apparatus according to claim 1, wherein the connection channels (4) are of curved construction and further comprise a device (10) for adjusting the velocity of circulation through said connection channels.

5. An apparatus according to claim 1 comprising a plurality of chambers 1 and 2, connected in series, each of said chambers 1 being interconnected to each other by lines (11).

* * * * *